(12) United States Patent
Iwasaki et al.

(10) Patent No.: US 10,890,137 B2
(45) Date of Patent: Jan. 12, 2021

(54) INTERNAL COMBUSTION ENGINE

(71) Applicant: HONDA MOTOR CO., LTD., Tokyo (JP)

(72) Inventors: Takao Iwasaki, Wako (JP); Yoshiyuki Ikebe, Wako (JP); Kazuyuki Kosei, Wako (JP); Takuya Warashina, Wako (JP); Kazuya Tanabe, Wako (JP); Hiroyuki Uchida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/492,685

(22) PCT Filed: Mar. 15, 2018

(86) PCT No.: PCT/JP2018/010292
§ 371 (c)(1),
(2) Date: Sep. 10, 2019

(87) PCT Pub. No.: WO2018/180557
PCT Pub. Date: Oct. 4, 2018

(65) Prior Publication Data
US 2020/0049102 A1 Feb. 13, 2020

(30) Foreign Application Priority Data
Mar. 30, 2017 (JP) .................. 2017-068891

(51) Int. Cl.
*F02F 7/00* (2006.01)
*F01M 11/03* (2006.01)
(Continued)

(52) U.S. Cl.
CPC ........... *F02F 7/0053* (2013.01); *F01M 11/03* (2013.01); *F02B 61/02* (2013.01); *F02D 41/009* (2013.01);
(Continued)

(58) Field of Classification Search
CPC ........ F02D 41/009; F01L 1/022; F02B 75/22; F02F 7/0012
See application file for complete search history.

(56) References Cited

U.S. PATENT DOCUMENTS

| 5,158,056 A * | 10/1992 | King ..................... F02P 7/067 123/192.2 |
| 5,715,794 A * | 2/1998 | Nakamura ............. F02D 21/08 123/305 |
| 2001/0039908 A1* | 11/2001 | Bilek ..................... F02B 33/44 114/55.5 |

FOREIGN PATENT DOCUMENTS

| JP | 1-99977 U | 7/1989 |
| JP | 4-203226 A | 7/1992 |

(Continued)

OTHER PUBLICATIONS

International Search Report, issued in PCT/JP2018/010292, dated Jun. 19, 2018.

*Primary Examiner* — Kevin A Lathers
(74) *Attorney, Agent, or Firm* — Birch, Stewart, Kolasch & Birch, LLP

(57) ABSTRACT

An internal combustion engine includes a crankshaft that is rotatably supported on a crankcase via a pair of bearings and has a crank housed in a crank chamber, a to-be-detected body that is housed in the crank chamber and is supported on the crankshaft, and a detection sensor that is made to face a trajectory of the to-be-detected body and detects movement of the to-be-detected body to generate a pulse signal. The to-be-detected body is disposed on an inner side of the bearing. Thus, an internal combustion engine is provided that enables a crank angle to be detected in a state in which vibration and flexure occurring in a crankshaft are suppressed.

10 Claims, 12 Drawing Sheets

(51) Int. Cl.
*F02B 61/02* (2006.01)
*F02D 41/00* (2006.01)
*F16C 3/06* (2006.01)
*F16C 3/22* (2006.01)
*G01M 15/06* (2006.01)
*G01D 5/245* (2006.01)

(52) U.S. Cl.
CPC .............. *F02F 7/0021* (2013.01); *F16C 3/06* (2013.01); *F16C 3/22* (2013.01); *G01M 15/06* (2013.01); *G01D 5/245* (2013.01)

(56) References Cited

FOREIGN PATENT DOCUMENTS

| | | |
|---|---|---|
| JP | 9-304008 A | 11/1997 |
| JP | 2002-54419 A | 2/2002 |
| JP | 2002-371906 A | 12/2002 |
| JP | 2004-278453 A | 10/2004 |
| JP | 2004-285853 A | 10/2004 |
| JP | 2006-63836 A | 3/2006 |
| JP | 2010-255674 A | 11/2010 |
| JP | 2013-245583 A1 | 12/2013 |
| JP | 2014-199040 A | 10/2014 |

* cited by examiner

INTERNAL COMBUSTION ENGINE

TECHNICAL FIELD

The present invention relates to an internal combustion engine that includes a crankcase that defines a crank chamber, a crankshaft that is rotatably supported on the crankcase via a pair of bearings and has a crank housed in the crank chamber, a to-be-detected body that is housed in the crank chamber and is supported on the crankshaft, and a detection sensor that is made to face a trajectory of the to-be-detected body and detects movement of the to-be-detected body to generate a pulse signal.

BACKGROUND ART

Patent Document 1 discloses a control device of an internal combustion engine. The internal combustion engine has a single cylinder configuration. The control device detects misfiring due to an over-lean air-fuel ratio in the single cylinder internal combustion engine. In the control device it is determined whether or not the amount of change in angular velocity of a crankshaft between two successive combustion cycles exceeds a predetermined threshold value. When the number of times when the amount of change exceeds the threshold value during a preset number of cycles attains a defined number of times, the control device assumes that there is misfiring of the internal combustion engine.

Patent Document 2 discloses a ring gear (a to-be-detected body) mounted on a crankshaft of an internal combustion engine, for determining misfiring. The extremity of an eddy current type microdisplacement sensor (detection sensor) opposes an outer peripheral face of the ring gear. The microdisplacement sensor detects a crank angle.

RELATED ART DOCUMENTS

Patent Documents

Patent Document 1: Japanese Patent Application Laid-open No. 2014-199040
Patent Document 2: Japanese Patent Application Laid-open No. 2002-371906

SUMMARY OF THE INVENTION

Problems to be Solved by the Invention

In the internal combustion engine, vibration and flexure occur in the crankshaft at the time of combustion. Therefore, in order to enhance the precision of detection by a ring gear, advanced technology is required.

The present invention has been accomplished in light of the above circumstances, and it is an object thereof to provide an internal combustion engine that enables a crank angle to be detected in a state in which vibration and flexure occurring in a crankshaft are suppressed.

Means for Solving the Problems

According to a first aspect of the present invention, there is provided an internal combustion engine comprising a crankcase that defines a crank chamber, a crankshaft that is rotatably supported on the crankcase via a pair of bearings and has a crank housed in the crank chamber, a to-be-detected body that is housed in the crank chamber and is supported on the crankshaft, and a detection sensor that is made to face a trajectory of the to-be-detected body and detects movement of the to-be-detected body to generate a pulse signal, characterized in that the to-be-detected body is disposed on an inner side of the bearing.

According to a second aspect of the present invention, in addition to the first aspect, wherein the bearing has an outer race member that is fixed to the crankcase, and an inner race member that is joined to the crankshaft and rotates relative to the outer race member, and the to-be-detected body is disposed between the inner race member and the crank.

According to a third aspect of the present invention, in addition to the second aspect, a locking mechanism is formed between the to-be-detected body and the crank, the locking mechanism preventing relative rotation between the to-be-detected body and the crankshaft around a rotational axis of the crankshaft.

According to a fourth aspect of the present invention, in addition to any one of the first to third aspects, the crank comprises a first crank web that has a crank weight and a first shaft supported on one of the bearings so that they can rotate around the rotational axis and that supports the to-be-detected body, a second crank web that has a crank weight and a second shaft supported on the other of the bearings so that they can rotate around the rotational axis and that supports a centrifugal oil filter, and a crank pin that is disposed at a position displaced from the rotational axis of the crankshaft, links the first crank web and the second crank web to each other, and is linked to a connecting rod.

According to a fifth aspect of the present invention, in addition to any one of the first to fourth aspects, the internal combustion engine further comprises a cylinder block that extends upward from the crankcase, and the detection sensor is mounted on an upper side of the crankcase at the rear of the cylinder block.

According to a sixth aspect of the present invention, in addition to any one of the first to fourth aspects, the detection sensor is mounted on a front wall of the crankcase.

According to a seventh aspect of the present invention, in addition to the sixth aspect, the detection sensor is disposed between engine hangers formed on the crankcase.

According to an eighth aspect of the present invention, in addition to any one of the first to seventh aspects, the to-be-detected body interferes with a drive gear on a main shaft of a transmission when viewed in an axial direction of the crankshaft.

Effects of the Invention

In accordance with the first aspect, in the internal combustion engine the crankshaft rotates in response to combustion. When the crankshaft is rotating, the to-be-detected body rotates integrally with the crankshaft. At the time of combustion, vibration and flexure occur in the crankshaft. Since the vibration and flexure are supported by the bearing, it is possible to minimize the vibration and flexure of the crankshaft at the position of the to-be-detected body. A crank angle can be detected in a state in which the vibration and flexure occurring in the crankshaft are thus suppressed.

In accordance with the second aspect, movement of the to-be-detected body in the axial direction of the crankshaft is restricted by the inner race member of the bearing and the crank of the crankshaft. When mounting the to-be-detected body, a restricting component specific to the to-be-detected body is not especially required. A cut in the number of components and simplification of the assembly step can be realized.

In accordance with the third aspect, the locking mechanism prevents relative rotation between the to-be-detected body and the crankshaft while the crankshaft is rotating. The to-be-detected body is therefore reliably synchronized with rotation of the crankshaft. Movement of the to-be-detected body reliably reflects the rotation of the crankshaft.

In accordance with the fourth aspect, since the to-be-detected body and the centrifugal oil filter are respectively mounted on the two crank webs, it is possible to join the to-be-detected body to the crank web without making the layout of the members complicated.

In accordance with the fifth aspect, since the detection sensor is disposed to the rear of the cylinder block on the upper side of the crankcase, it is possible to protect the front side of the detection sensor without providing a protecting cover on the detection sensor.

In accordance with the sixth aspect, since almost no other components are present in front of the crankcase, and an open space is ensured, any influence on the layout of other members when mounting the detection sensor can be suppressed.

In accordance with the seventh aspect, since the crankcase is fixed to the vehicle body frame by the engine hangers, it is possible to protect the front and rear sides of the detection sensor without providing a protecting cover on the detection sensor.

In accordance with the eighth aspect, since the gap between the crankshaft and the main shaft of the transmission can be narrowed regardless of the position of the to-be-detected body, it is possible to realize small dimensions for the internal combustion engine.

EXPLANATION OF REFERENCE NUMERALS AND SYMBOLS

Figure 1:
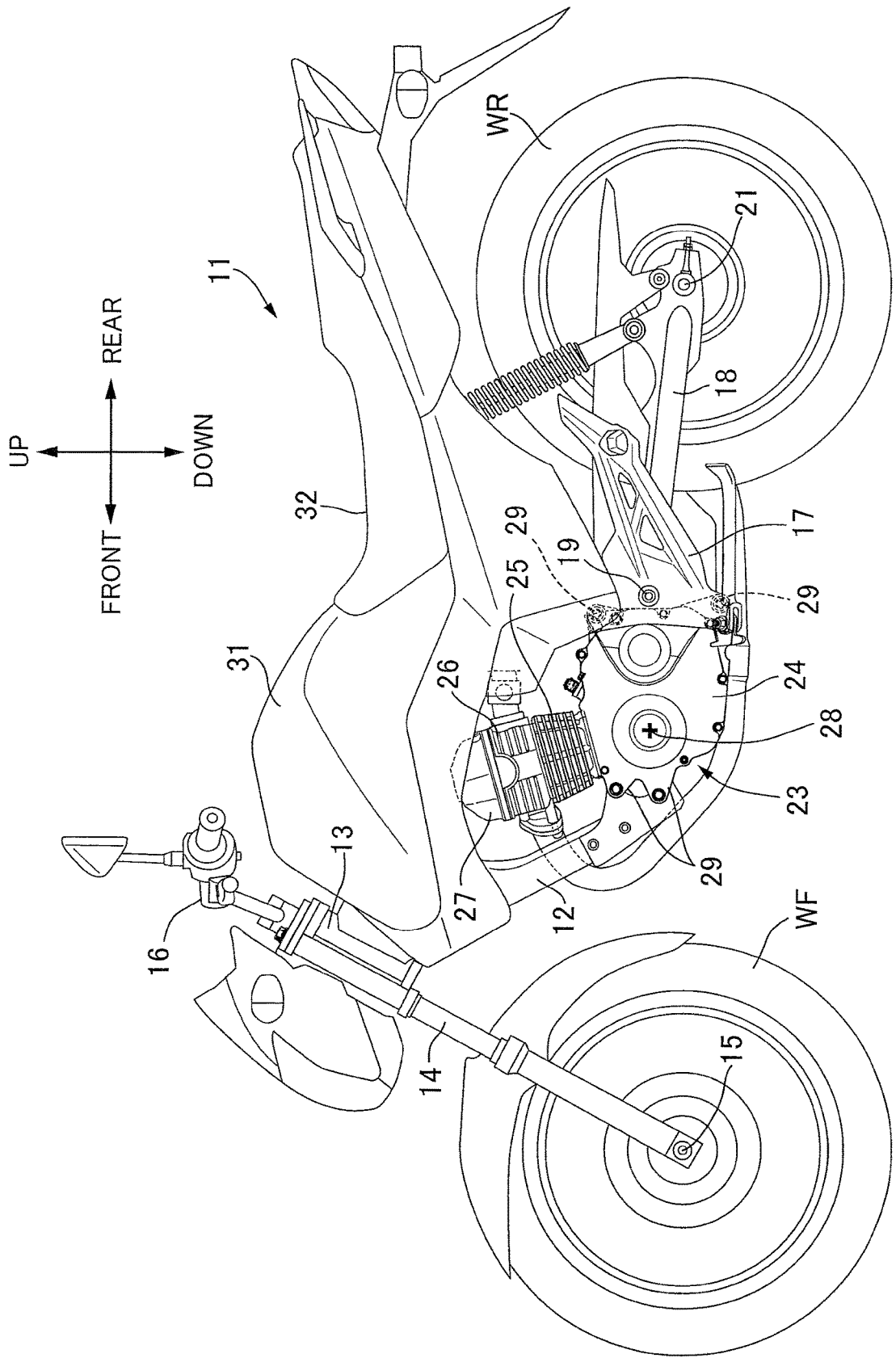
FIG. 1 is a side view schematically showing the overall arrangement of a two-wheeled motor vehicle.

23 Internal combustion engine
24 Crankcase
24a Crank chamber
24b Front wall
25 Cylinder block
28 Rotational axis (of crankshaft)
29 Engine hanger
36 Connecting rod
37 Crankshaft
38 To-be-detected body (pulser ring)
39 Detection sensor (pulser sensor)
42 First crank web (of crank)
42a First shaft
43 Second crank web (of crank)
43a Second shaft
44 Crank pin (of crank)
45 One bearing (first bearing)
47 Other bearing (second bearing)
51a Outer race member
51b Inner race member
61 Crank weight
62 Crank weight
67 Locking mechanism
71 Transmission (multistage transmission)
72 Main shaft
81 Drive gear (fourth speed drive gear)
83 Drive gear (fifth speed drive gear)
123 Locking mechanism

MODES FOR CARRYING OUT THE INVENTION

One embodiment of the present invention is explained below by reference to the attached drawings. Here, the top and bottom, front and rear, and left and right of a vehicle body are defined based on the point of view of a person riding a two-wheeled motor vehicle.

FIG. 1 schematically shows the overall arrangement of a two-wheeled motor vehicle related to one embodiment of the present invention. A two-wheeled motor vehicle 11 includes a vehicle body frame 12. A front fork 14 is steerably supported on a head pipe 13 via the front end of the vehicle body frame 12. A front wheel WF is supported on the front fork 14 so that it can rotate around an axle 15. Handlebars 16 are joined to the front fork 14 on an upper side of the head pipe 13. A swing arm 18 is supported on a pivot frame 17 on a rear side of the vehicle body frame 12 so that it can swing around a support shaft 19 extending horizontally in the vehicle width direction. A rear wheel WR is supported at the rear end of the swing arm 18 so that it can rotate around an axle 21.

An internal combustion engine 23 is mounted on the vehicle body frame 12 between the front wheel WF and the rear wheel WR. The internal combustion engine 23 includes a crankcase 24, a cylinder block 25 joined to the crankcase 24 and extending upward from the crankcase 24, a cylinder head 26 joined to the cylinder block 25, and a head cover 27 joined to the cylinder head 26. A crankshaft (described later) rotating around a rotational axis 28 extending in parallel with the axle 21 of the rear wheel WR is housed in the crankcase 24. The rotation of the crankshaft is transmitted to the rear wheel WR via a power transmission device (not illustrated). Engine hangers 29 are formed on the crankcase 24, with two at the front and two at the rear. The engine hangers 29 are arranged vertically at the front and the rear respectively. The crankcase 24 is linked and fixed to the vehicle body frame 12 by the engine hangers 29.

A fuel tank 31 is mounted on the vehicle body frame 12 above the internal combustion engine 23. A rider's seat 32 is mounted on the vehicle body frame 12 to the rear of the fuel tank 31. Fuel is supplied from the fuel tank 31 to a fuel injection device of the internal combustion engine 23. When driving the two-wheeled motor vehicle 11 the rider straddles the rider's seat 32.

Figure 2:
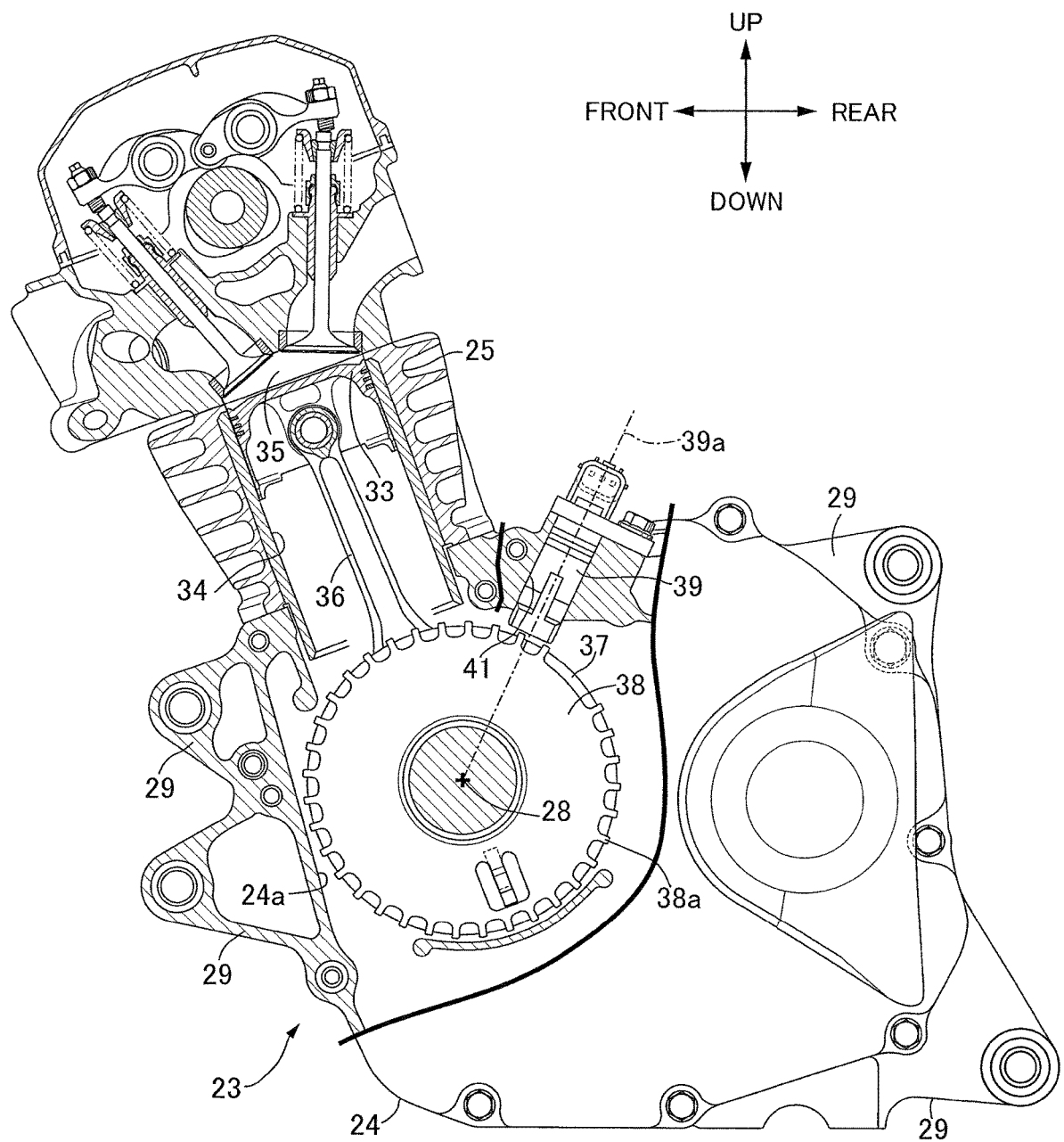
FIG. 2 is an enlarged partial sectional view of the two-wheeled motor vehicle schematically showing the structure of an internal combustion engine.

As shown in FIG. 2, the internal combustion engine 23 includes a piston 33 incorporated into the cylinder block 25. The piston 33 is housed in a cylinder 34 that has a forwardly inclined cylinder axis and is defined within the cylinder block 25. Here, the cylinder 34 formed in the cylinder block 25 is a single cylinder, and the piston 33 received by the cylinder 34 is a single piston. A combustion chamber 35 is defined between the piston 33 and the cylinder head 26.

One end of a connecting rod 36 is linked to the piston 33. The other end of the connecting rod 36 is linked to a crankshaft 37 within the crankcase 24. Linear movement in the axial direction of the piston 33 is converted into rotation of the crankshaft 37 by the action of the connecting rod 36.

The internal combustion engine 23 includes an annular plate-shaped pulser ring (to-be-detected body) 38 that is joined to the crankshaft 37 coaxially with the rotational axis 28 and rotates integrally with the crankshaft 37, and a pulser sensor (detection sensor) 39 that is made to face an annular trajectory of the pulser ring 38 and generates a pulse signal in response to movement of the pulser ring 38. The pulser ring 38 includes a plurality of reluctors 38a arranged at equal intervals in an annular shape around the rotational axis 28. The reluctors 38a are disposed at intervals with a central angle of for example 10 degrees. The reluctor 38a is formed from for example a magnetic material. Details of the pulser ring 38 are described later.

The pulser sensor 39 is inserted from the outside into a sensor hole 41 bored in the crankcase 24 and is mounted on the crankcase 24. The pulser sensor 39 is retained in an attitude in which it is inclined with respect to the vehicle vertical direction, which is orthogonal to the ground. Here, the pulser sensor 39 is disposed on the upper side of the crankcase 24 to the rear of the cylinder block 25. The pulser sensor 39 is positioned between the engine hangers 29.

The pulser sensor 39 faces a crank chamber 24a via an extremity that detects a magnetic material. In the pulser sensor 39 a detection axis 39a that has the highest sensitivity is directed toward the rotational axis 28. The pulser sensor 39 outputs an electric signal in response to the existence of a magnetic material detected on the trajectory of the pulser ring 38. The pulser sensor 39 outputs a pulse signal that specifies an angular position of the crankshaft 37.

Figure 3:
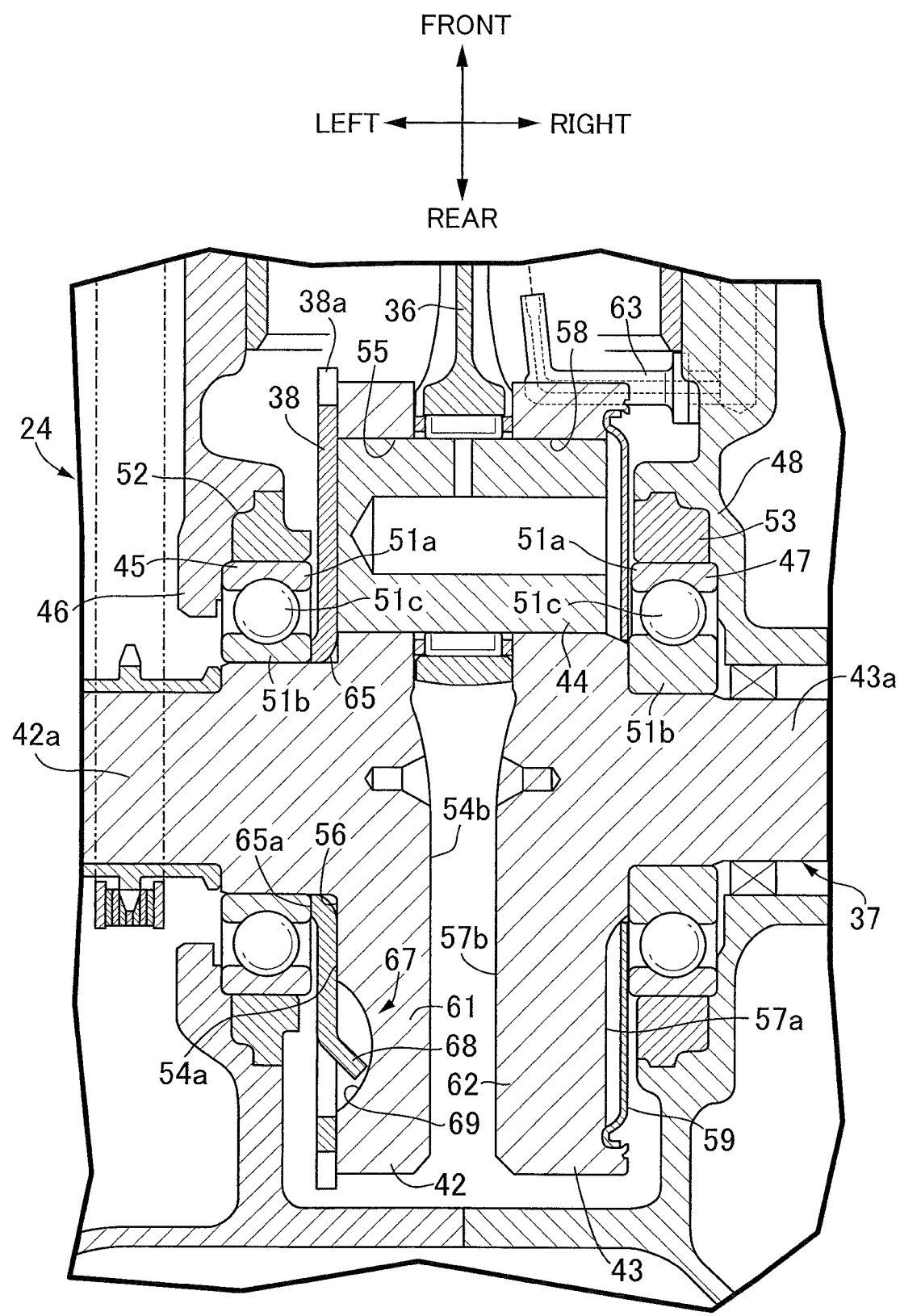
FIG. 3 is an enlarged partial sectional view of the internal combustion engine schematically showing the structure of a crankshaft.

As shown in FIG. 3, the crank of the crankshaft 37 includes a disk-shaped first crank web 42 having a first shaft 42a, a disk-shaped second crank web 43 joined to the first crank web 42 and having a second shaft 43a, and a crank pin 44 linking the first crank web 42 and the second crank web 43 to each other while the first shaft 42a and the second shaft 43a are coaxially disposed. The axis of the crank pin 44 is disposed at a position displaced from the rotational axis 28 of the crankshaft 37. The extremity of the connecting rod 36 is linked to the crank pin 44 so that it can rotate around a rotational axis parallel to the axis of the first shaft 42a and the second shaft 43a.

The first shaft 42a of the first crank web 42 is rotatably supported on a first half body 46 of the crankcase 24 via a first bearing 45. The second shaft 43a of the second crank web 43 is rotatably supported on a second half body 48 of the crankcase 24 via a second bearing 47. The crankcase 24 is formed by joining the first half body 46 and the second half body 48. The first bearing 45 and the second bearing 47 are in contact with the space within the crank chamber 24a via inside faces inwardly opposing each other in the axial direction of the crankshaft 37.

The first bearing 45 and the second bearing 47 are each formed from a ball bearing. Therefore, the bearings 45 and 47 individually have an annular outer race member 51a that is fixed to the crankcase 24, an inner race member 51b that is joined to the first shaft 42a and the second shaft 43a of the crankshaft 37 and rotates relative to the corresponding outer race member 51a, and a plurality of balls 51c that are retained between the outer race member 51a and the inner race member 51b and are in rolling contact with the outer race member 51a and the inner race member 51b. The first shaft 42a and the second shaft 43a are fitted into the corresponding inner race member 51b. They may be press fitted. A metal first bush 52 receiving the outer race member 51a of the first bearing 45 is embedded in the first half body 46 of the crankcase 24. A metal second bush 53 receiving the outer race member 51a of the second bearing 47 is embedded in the second half body 48 of the crankcase 24. The outer race member 51a may be fitted into the corresponding first bush 52 or second bush 53. The outside face of the outer race member 51a is covered by the first half body 46 and the second half body 48 respectively. The outside face of the inner race member 51b is spaced from the first half body 46 and the second half body 48 respectively. The inside face of the outer race member 51a opposes the first crank web 42 and the second crank web 43 across a gap.

A pin hole 55 extending through from a first face 54a to a second face 54b on the other side of the first face 54a is defined in the first crank web 42. The pin hole 55 is formed as a columnar body space having an axis parallel to the axis of the first shaft 42a. The crank pin 44 is fitted into the pin hole 55. The crank pin 44 may be press fitted into the pin hole 55.

A flat face 56 is formed on the first face 54a of the first crank web 42, the flat face 56 spreading within a virtual plane orthogonal to the axis of the first shaft 42a. The flat face 56 extends in a ring shape along at least the outer periphery of the first shaft 42a. The pulser ring 38 is superimposed on the flat face 56. The reluctor 38a of the pulser ring 38 projects further in the radial direction than the outer periphery of the first crank web 42, at least at the outer end in the radial direction.

The pulser ring 38 is sandwiched between the inner race member 51b of the first bearing 45 and the flat face 56 of the first crank web 42. The pulser ring 38 is therefore disposed so as to be in contact with the inside face of the inner race member 51b of the first bearing 45. Due to being thus sandwiched, the pulser ring 38 is fixed to the crankshaft 37.

A pin hole 58 extending through from a first face 57a to a second face 57b on the other side of the first face 57a is defined in the second crank web 43. The pin hole 58 is formed as a columnar body space having an axis parallel to the axis of the second shaft 43a. The crank pin 44 is fitted into the pin hole 58. The crank pin 44 may be press fitted into the pin hole 58.

A centrifugal oil filter 59 is installed on the first face 57a of the second crank web 43. The centrifugal oil filter 59 is housed in a depression of the first face 57a. The centrifugal oil filter 59 filters foreign matter in lubricating oil by virtue of centrifugal force while the second crank web 43 is rotating. The second crank web 43 is made to face the second face 54b of the first crank web 42 via the second face 57b on the other side of the first face 57a.

A crank weight 61 is formed integrally with the second face 54b of the first crank web 42. The center of gravity of the first crank web 42 is positioned for example at a position that is shifted by 180 degrees from the axis of the pin hole 55 around the axis of the first shaft 42a. Similarly, a crank weight 62 is formed integrally with the second face 57b of the second crank web 43. The center of gravity of the second crank web 43 is positioned for example at a position that is shifted by 180 degrees from the axis of the pin hole 58 around the axis of the second shaft 43a. Uneven rotation of the crankshaft 37 during rotation is minimized by the action of the crank weights 61 and 62.

An oil jet 63 is disposed on the crankcase 24 on the radially outer side of the centrifugal oil filter 59. The oil jet 63 injects lubricating oil within the cylinder 34 toward the piston 33. Lubricating oil can be supplied to the oil jet 63 for example from an oil pump (not illustrated) that is coupled with the rotation of the crankshaft 37.

Figure 4:
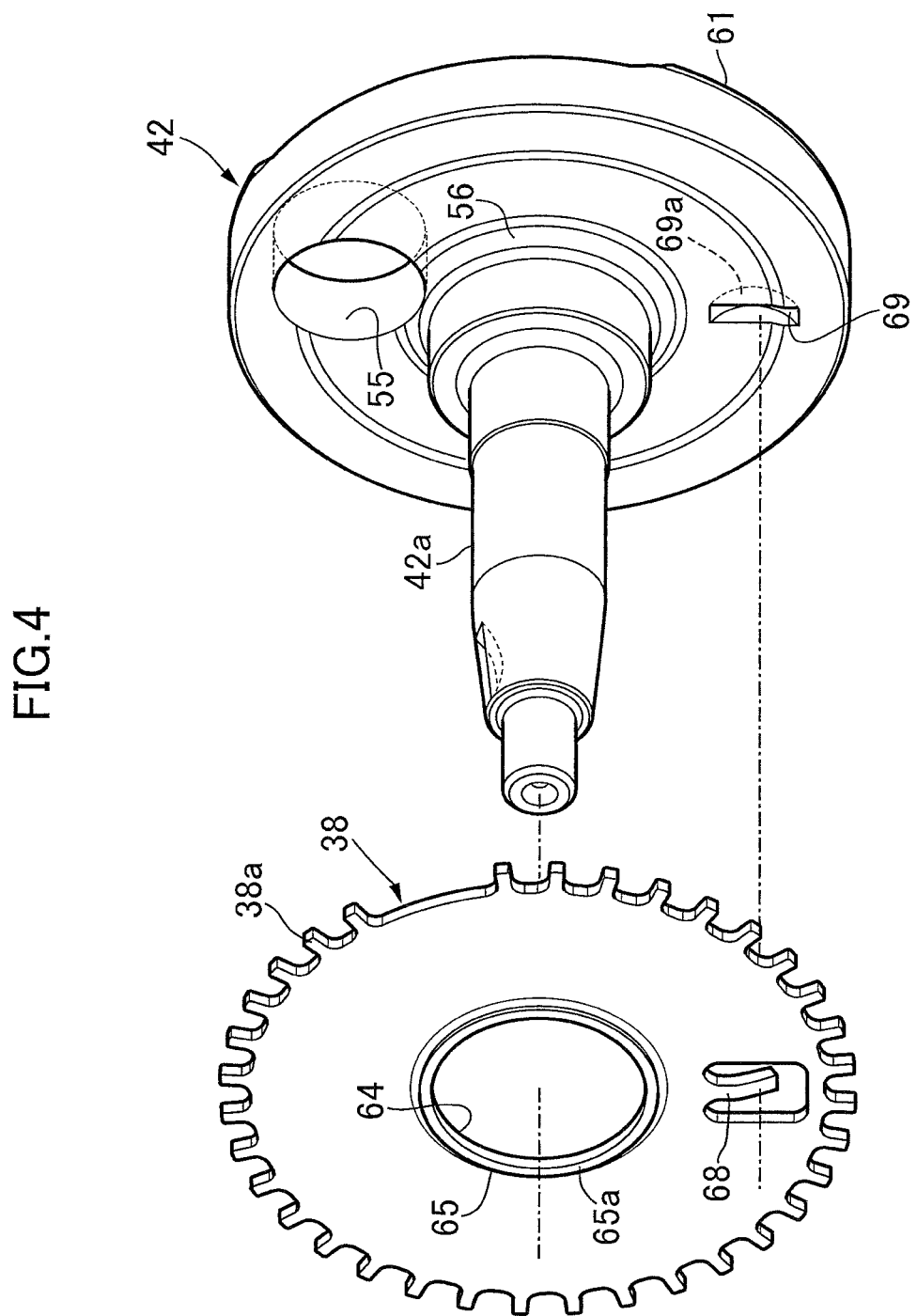
FIG. 4 is an enlarged perspective view of a pulser ring and a first crank web.

Referring in addition to FIG. 4, a through hole 64 is formed in the center of the pulser ring 38. The outline of the through hole 64 is formed as a circle that is concentric with the first shaft 42a. The first shaft 42a is fitted into the through hole 64. A tubular protrusion 65 protruding in the axial direction of the first shaft 42a is formed at the edge of the through hole 64. The pulser ring 38 is in plane contact with the inner race member 51b of the first bearing 45 via the end face 65a of the protrusion 65. The pulser ring 38 is pressed against the inner race member 51b of the first bearing 45, but a gap is ensured between the surface of the pulser ring 38 and the outer race member 51a of the first bearing 45 by the action of the protrusion 65.

A locking mechanism 67 is formed between the pulser ring 38 and the first crank web 42, the locking mechanism 67 preventing relative rotation between the pulser ring 38 and the first crank web 42 around the rotational axis 28 of the crankshaft 37. The locking mechanism 67 has a projecting piece 68 that is formed integrally with the pulser ring 38 and projects from a surface overlapping (or facing) the first face 54a of the first crank web 42 and a depression 69 that receives the projecting piece 68 of the pulser ring 38. Since the pulser ring 38 is molded by press forming a metal plate material, the projecting piece 68 is cut and raised from the plate material. The valley fold line of the projecting piece 68 extends in a tangential direction that touches a concentric circle of the pulser ring 38. Therefore, although the projecting piece 68 is a plate material, it exhibits high stiffness toward a load from the peripheral direction of the pulser ring 38.

The depression 69 has a vertical face 69a that is in contact with the outline of the projecting piece 68. The vertical face 69a corresponds to a plane parallel to the axis of the first shaft 42a. The vertical face 69a preferably spreads within a virtual plane including the axis of the first shaft 42a. In this way, if the vertical face 69a is orthogonal to the peripheral direction of the first crank web 42, the load in the peripheral direction of the first crank web 42 can be dispersed and transmitted to the projecting piece 68.

The operation of the internal combustion engine 23 related to the present embodiment is now explained. In the internal combustion engine 23 the crankshaft 37 rotates in response to combustion. While the crankshaft 37 is rotating, the pulser ring 38 rotates integrally with the crankshaft 37. At the time of combustion, vibration and flexure occur in the crankshaft 37. Since the vibration and flexure are supported by the first bearing 45 and the second bearing 47, the vibration and flexure of the crankshaft 37 can be minimized at the position of the pulser ring 38 adjacent to the first bearing 45. In a state in which the vibration and flexure occurring in the crankshaft 37 are thus suppressed a crank angle can be detected.

The pulser ring 38 is disposed between the inner race member 51b of the first bearing 45 and the first crank web 42. Movement of the pulser ring 38 is restricted in the axial direction of the crankshaft 37 by means of the inner race member 51b of the first bearing 45 and the first crank web 42 of the crankshaft 37. When mounting the pulser ring 38, a restricting component specific to the pulser ring 38 is not especially required. A cut in the number of components and simplification of the assembly step can be realized.

The locking mechanism 67 is formed between the pulser ring 38 and the first crank web 42, the locking mechanism 67 preventing relative rotation between the pulser ring 38 and the crankshaft 37 around the rotational axis 28 of the crankshaft 37. The locking mechanism 67 prevents relative rotation between the pulser ring 38 and the crankshaft 37 while the crankshaft 37 is rotating. The pulser ring 38 is therefore reliably synchronized with rotation of the crankshaft 37. Movement of the pulser ring 38 reliably reflects the rotation of the crankshaft 37.

In the present embodiment, the crank of the crankshaft 37 includes the first crank web 42 having the first shaft 42a and the crank weight 61 supported on the first bearing 45 so that they can rotate around the rotational axis 28 and supporting the pulser ring 38, the second crank web 43 having the second shaft 43a and the crank weight 62 supported on the second bearing 47 so that they can rotate around the rotational axis 28 and supporting the centrifugal oil filter 59, and the crank pin 44 disposed at a position displaced from the rotational axis 28 of the crankshaft 37, linking the first crank web 42 and the second crank web 43 to each other, and linked to the connecting rod 36. Since the pulser ring 38 is mounted on the first crank web 42 whereas the centrifugal oil filter 59 is mounted on the second crank web 43, the pulser ring 38 can be joined to the first crank web 42 without making the layout of the members complicated.

In the internal combustion engine 23, the pulser sensor 39 is mounted on the upper side of the crankcase 24 to the rear of the cylinder block 25. Since the pulser sensor 39 is disposed to the rear of the cylinder block 25, which extends upward from the crankcase 24, it is possible to protect the front side of the pulser sensor 39 without providing a protecting cover on the pulser sensor 39.

As described above, the pulser sensor 39 is disposed between the engine hangers 29 formed on the crankcase 24. Since the crankcase 24 is fixed to the vehicle body frame 12 by the engine hangers 29, it is possible to protect the front and rear sides of the pulser sensor 39 without providing a protecting cover on the pulser sensor 39.

Figure 5:
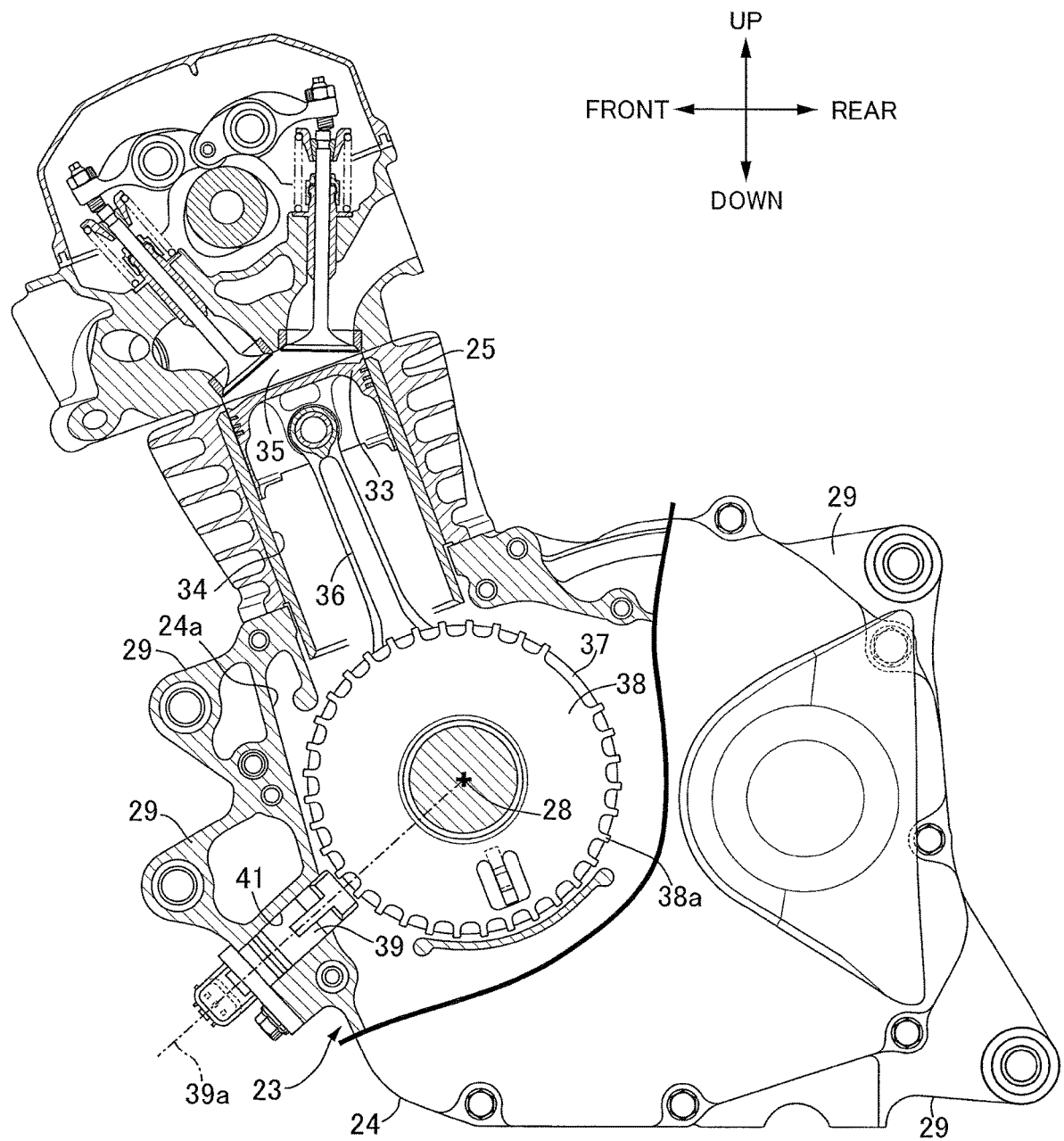
FIG. 5 is an enlarged partial sectional view, corresponding to FIG. 2, of the two-wheeled motor vehicle schematically showing a pulser sensor related to another layout.
Figure 6:
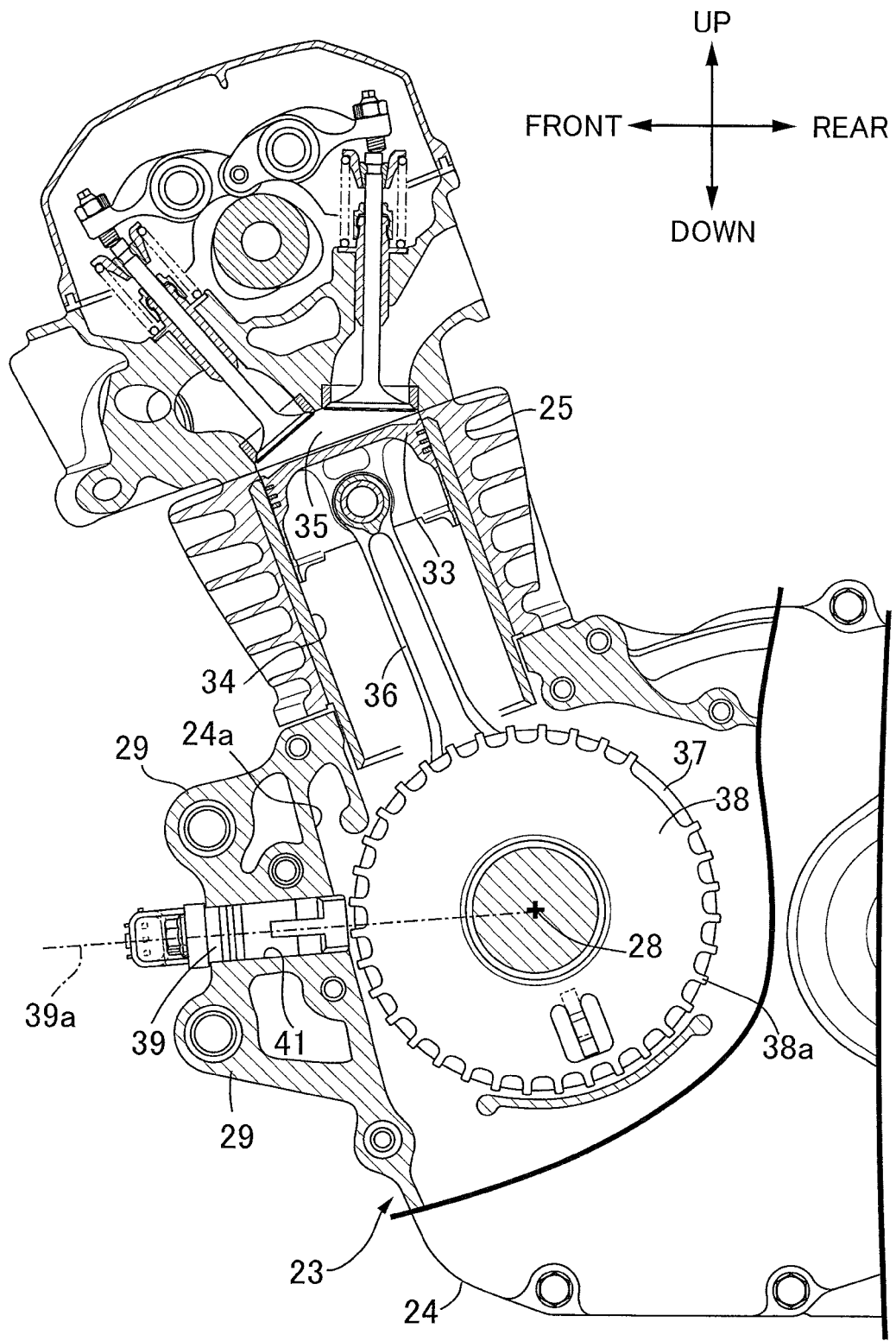
FIG. 6 is an enlarged partial sectional view, corresponding to FIG. 2, of the two-wheeled motor vehicle schematically showing a pulser sensor related to yet another layout.

Alternatively, as shown in FIG. 5, the pulser sensor 39 may be mounted on the front wall 24b of the crankcase 24. The pulser sensor 39 may be retained in an attitude in which it is inclined with respect to the vehicle vertical direction, which is orthogonal to the ground. As in the case described above, the detection axis 39a of the pulser sensor 39 may be directed toward the rotational axis 28 of the crankshaft 37. Almost no other components are present in front of the crankcase 24, and since an open space is ensured, any influence on the layout of other members when mounting the pulser sensor 39 can be suppressed. As shown in FIG. 6, the pulser sensor 39 may be mounted on the front wall 24b of the crankcase 24 between the pair of upper and lower engine hangers 29. Since the vehicle body frame 12 (the down frame extending downward from head pipe 13) is joined to the engine hanger 29 from the front, it is possible to protect the front and rear sides of the pulser sensor 39 without providing a protecting cover for exclusive use on the pulser sensor 39.

Figure 7:
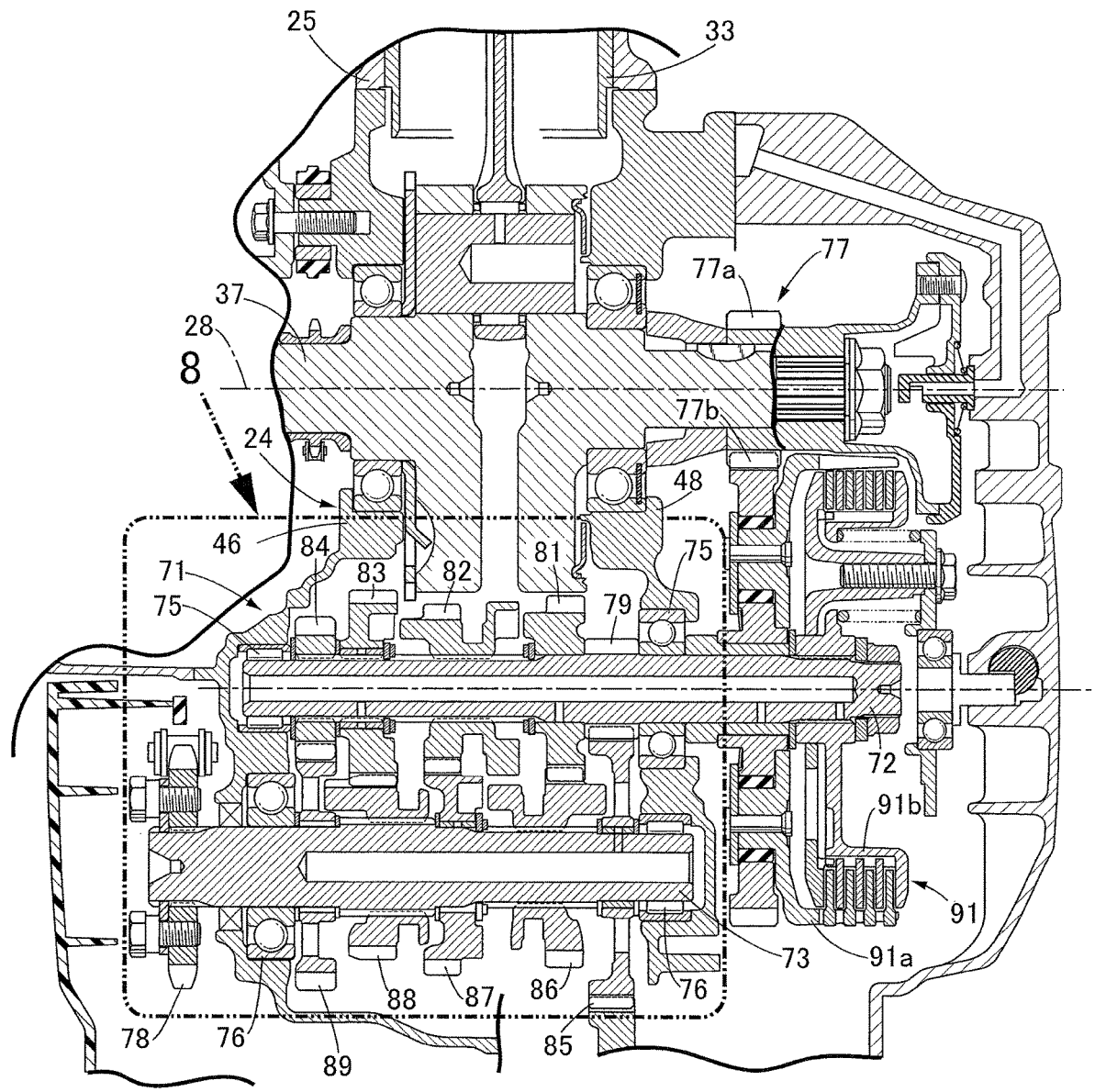
FIG. 7 is an enlarged partial sectional view schematically showing the arrangement of a multistage transmission.

As shown in FIG. 7, a dog clutch type multistage transmission (power transmission device) 71 is incorporated into the internal combustion engine 23. The multistage transmission 71 includes a main shaft 72 and a counter shaft 73 having an axis parallel to the axis (rotational axis 28) of the crankshaft 37. The main shaft 72 and the counter shaft 73 are rotatably supported on the first half body 46 and the second half body 48 via bearings 75 and 76 fitted into the first half body 46 and the second half body 48 respectively of the crankcase 24. The main shaft 72 is connected to the crankshaft 37 via a primary reduction mechanism 77. The primary reduction mechanism 77 includes a drive gear 77a fixed to the crankshaft 37, and a driven gear 77b relatively rotatably supported on the main shaft 72. The driven gear 77b meshes with the drive gear 77a. A drive sprocket 78 is joined to the counter shaft 73.

Five drive gears are disposed on the main shaft 72. The drive gears include, in sequence between the bearings 75, a low drive gear 79, a fourth speed drive gear 81, a third speed drive gear 82, a fifth speed drive gear 83, and a second speed drive gear 84. Similarly, five driven gears are disposed in sequence between the bearings 76 on the counter shaft 73. The driven gears include a low driven gear 85, a fourth speed driven gear 86, a third speed driven gear 87, a fifth speed driven gear 88, and a second speed driven gear 89. In the multistage transmission 71, coupled states are selectively switched between a neutral state, a first speed coupled state, a second speed coupled state, a third speed coupled state, a fourth speed coupled state, and a fifth speed coupled state. Details of the multistage transmission 71 are described later.

A friction clutch 91 is incorporated into the internal combustion engine 23. The friction clutch 91 includes a clutch outer 91a and a clutch hub 91b. The driven gear 77b of the primary reduction mechanism 77 is linked to the clutch outer 91a. In the friction clutch 91 it is possible to switch between connection and disconnection between the clutch outer 91a and the clutch hub 91b in response to operation of a clutch lever.

Figure 8:
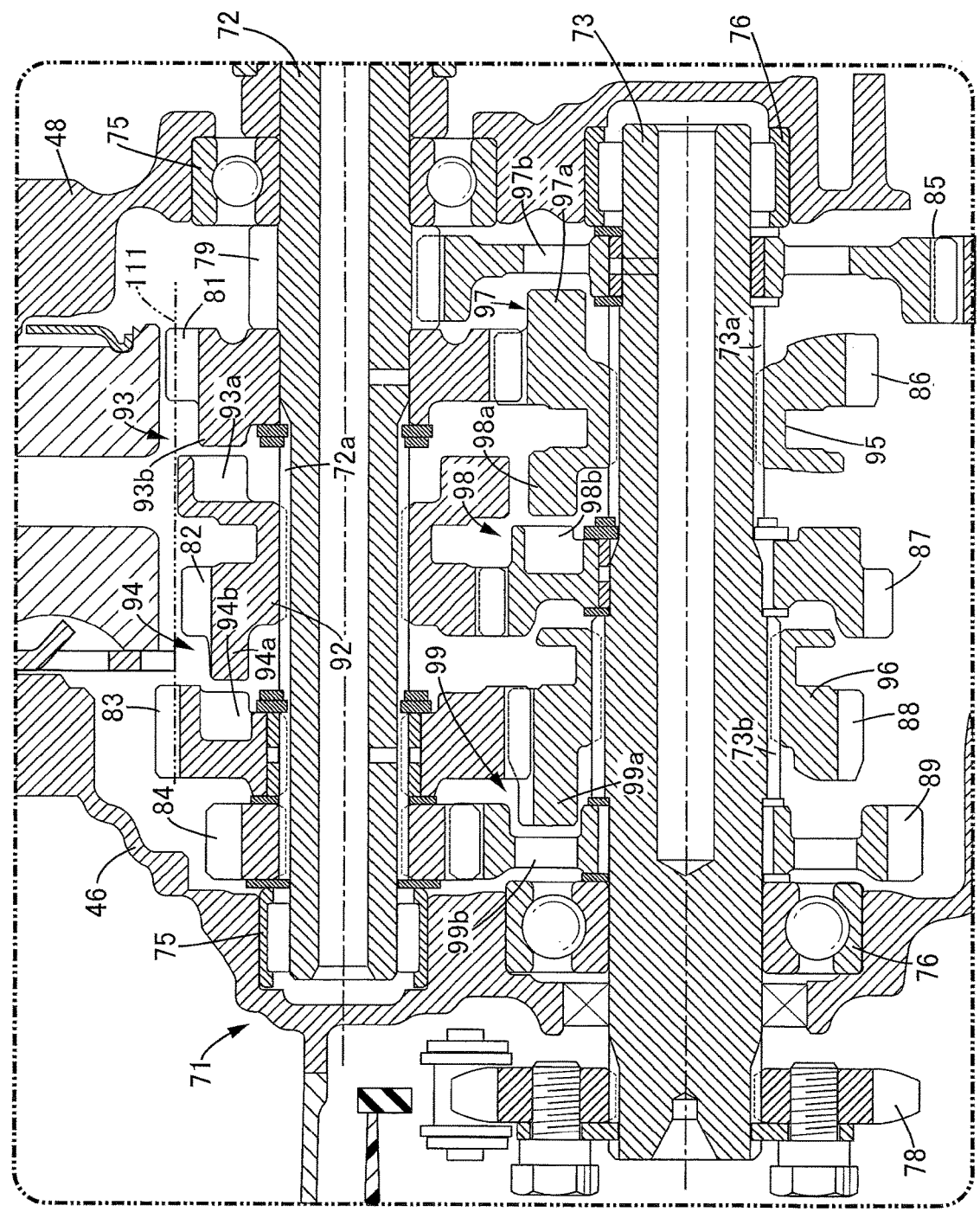
FIG. 8 is an enlarged sectional view of part of FIG. 7.

As shown in FIG. 8, in the multistage transmission 71 the low drive gear 79 is cut on the main shaft 72. The fourth speed drive gear 81 is supported on the main shaft 72 so that it can rotate relative to the main shaft 72 but cannot be displaced in the axial direction. The third speed drive gear 82 is integrated with a first shifter 92. The first shifter 92 is fitted onto a spline 72a cut on the main shaft 72 and is supported on the spline 72a so that it cannot be rotated relative thereto but can be displaced in the axial direction. The fifth speed drive gear 83 is supported on the main shaft 72 so that it can rotate relative to the main shaft 72 but cannot be displaced in the axial direction. The second speed drive gear 84 is supported on the main shaft 72 so that it cannot be rotated relative to the main shaft 72 and cannot be displaced in the axial direction.

A first fitting mechanism 93 is formed between the fourth speed drive gear 81 and the third speed drive gear 82. The first fitting mechanism 93 includes a plurality of drive projecting parts 93a formed on the first shifter 92 and a plurality of driven projecting parts 93b formed on the fourth speed drive gear 81. When the first shifter 92 is positioned at an axial reference position on the spline 72a, the trajectory of the drive projecting part 93a moves away from the trajectory of the driven projecting part 93b. In this process, relative rotation between the fourth speed drive gear 81 and the first shifter 92 around the axis of the main shaft 72 is allowed. When the first shifter 92 is displaced by a first distance from the axial reference position toward the fourth speed drive gear 81 and moves to a first operating position, the drive projecting part 93a enters between peripherally adjacent driven projecting parts 93b on the fourth speed drive gear 81. The driven projecting part 93b and the drive projecting part 93a mesh with each other around the axis of the main shaft 72. When meshed, the fourth speed drive gear 81 is relatively non-rotatably joined to the main shaft 72 via the first shifter 92.

A second fitting mechanism 94 is formed between the third speed drive gear 82 and the fifth speed drive gear 83. The second fitting mechanism 94 includes a plurality of drive projecting parts 94a formed on the first shifter 92 and a plurality of driven projecting parts 94b formed on the fifth speed drive gear 83. When the first shifter 92 is positioned at the axial reference position on the spline 72a, the trajectory of the drive projecting part 94a moves away from the trajectory of the driven projecting part 94b. In this process, relative rotation between the first shifter 92 and the fifth speed drive gear 83 around the axis of the main shaft 72 is allowed. When the first shifter 92 is displaced by a second distance from the axial reference position toward the fifth speed drive gear 83 and moves to a second operating position, the drive projecting part 94a enters between peripherally adjacent driven projecting parts 94b on the fifth speed drive gear 83. The drive projecting part 94a and the driven projecting part 94b mesh with each other around the axis of the main shaft 72. When meshed, the fifth speed drive gear 83 is relatively non-rotatably joined to the main shaft 72 via the first shifter 92.

The low driven gear 85 is relatively rotatably and axially non-displaceably supported on the counter shaft 73. The low driven gear 85 meshes with the low drive gear 79 on the main shaft 72. The fourth speed driven gear 86 is integrated with a second shifter 95. The second shifter 95 is fitted onto a first spline 73a cut on the counter shaft 73 and relatively non-rotatably and axially displaceably supported on the first spline 73a. The third speed driven gear 87 is supported on the counter shaft 73 relatively rotatably and axially non-displaceably with respect to the counter shaft 73. The fifth speed driven gear 88 is integrated with a third shifter 96. The third shifter 96 is fitted onto a second spline 73b cut on the counter shaft 73 and relatively non-rotatably and axially displaceably supported on the second spline 73b. The second speed driven gear 89 is relatively rotatably and axially non-displaceably supported on the counter shaft 73. The second speed driven gear 89 meshes with the second speed drive gear 84 on the main shaft 72.

A third fitting mechanism 97 is formed between the low driven gear 85 and the fourth speed driven gear 86. The third fitting mechanism 97 includes a plurality of drive projecting parts 97a formed on the second shifter 95 and a plurality of driven projecting parts 97b formed on the low driven gear 85. When the second shifter 95 is positioned at an axial reference position on the first spline 73a, the trajectory of the drive projecting part 97a moves away from the trajectory of the driven projecting part 97b. In this process, relative rotation between the second shifter 95 and the low driven gear 85 around the axis of the counter shaft 73 is allowed. When the second shifter 95 is displaced from the axial reference position toward the low driven gear 85 by a third distance and moves to a third operating position, the drive projecting part 97a enters between peripherally adjacent driven projecting parts 97b on the low driven gear 85. The drive projecting part 97a and driven projecting part 97b mesh with each other around the axis of the counter shaft 73. When meshed, the low driven gear 85 is relatively non-rotatably joined to the counter shaft 73 via the second shifter 95.

A fourth fitting mechanism 98 is formed between the fourth speed driven gear 86 and the third speed driven gear 87. The fourth fitting mechanism 98 includes a plurality of drive projecting parts 98 formed on the second shifter 95 and a plurality of driven projecting parts 98b formed on the third speed driven gear 87. When the second shifter 95 is positioned at the axial reference position on the first spline 73a, the trajectory of the drive projecting part 98a moves away from the trajectory of the driven projecting part 98b. In this process, relative rotation around the axis of the counter shaft 73 between the second shifter 95 and the third speed driven gear 87 is allowed. When the second shifter 95 is displaced toward the third speed driven gear 87 by a fourth distance from the axial reference position and moves to a fourth operating position, the drive projecting part 98a enters between peripherally adjacent driven projecting parts 98b on the third speed driven gear 87. The drive projecting part 98a and the driven projecting part 98b mesh with each other around the axis of the counter shaft 73. When meshed, the third speed driven gear 87 is relatively non-rotatably joined to the counter shaft 73 via the second shifter 95.

A fifth fitting mechanism 99 is formed between the fifth speed driven gear 88 and the second speed driven gear 89. The fifth fitting mechanism 99 includes a plurality of drive projecting parts 99a formed on the third shifter 96 and a plurality of driven projecting parts 99b formed on the second speed driven gear 89. When the third shifter 96 is positioned at an axial reference position on the second spline 73b, the trajectory of the drive projecting part 99a moves away from the trajectory of the driven projecting part 99b. In this process, relative rotation between the third shifter 96 and the second speed driven gear 89 around the axis of the counter shaft 73 is allowed. When the third shifter 96 is displaced toward the second speed driven gear 89 by a fifth distance from the axial reference position and moves to a fifth operating position, the drive projecting part 99a enters between peripherally adjacent driven projecting parts 99b on the second speed driven gear 89. The drive projecting part 99a and driven projecting part 99b mesh with each other around the axis of the counter shaft 73. When meshed, the second speed driven gear 89 is relatively non-rotatably joined to the counter shaft 73 via the third shifter 96.

In the present embodiment the drive projecting parts 94a, 97a, 98a, and 99a and the driven projecting part 93b are projections extending along the axial direction of the main shaft 72 or the counter shaft 73, and the driven projecting parts 94b, 97b, 98b, and 99b and the drive projecting part 93a individually corresponding thereto are formed from a peripheral wall of an engagement hole or a depression receiving the projection. The projection is in plane contact with the peripheral wall of the engagement hole or the depression in the rotational direction of the main shaft 72 or the counter shaft 73. A contact plane that spreads within a virtual plane including the axis of the main shaft 72 or the counter shaft 73 may be defined on the projection and the engagement hole (or the depression) respectively.

When the first shifter 92, that is, the third speed drive gear 82, is positioned at the axial reference position on the main shaft 72, and the second shifter 95 and the third shifter 96 (that is, the fourth speed driven gear 86 and the fifth speed driven gear 88) are positioned at the axial reference positions on the counter shaft 73, the fourth speed drive gear 81 on the main shaft 72 meshes with the fourth speed driven gear 86 on the counter shaft 73, the third speed drive gear 82 on the main shaft 72 meshes with the third speed driven gear 87 on the counter shaft 73, and the fifth speed drive gear 83 on the main shaft 72 meshes with the fifth speed driven gear 88 on the counter shaft 73. The fourth speed drive gear 81 and the fifth speed drive gear 83 rotate relative to the main shaft 72. The low driven gear 85, the third speed driven gear 87, and the second speed driven gear 89 rotate relative to the counter shaft 73. In this state no rotational power is transmitted from the main shaft 72 to the counter shaft 73. A neutral state is established in the multistage transmission 71.

When the second shifter 95, that is, the fourth speed driven gear 86, in the neutral state moves from the axial reference position to the third operating position on the counter shaft 73, the drive projecting part 97a of the second shifter 95 meshes with the driven projecting part 97b of the low driven gear 85 in the third fitting mechanism 97. The low driven gear 85 is joined to the counter shaft 73. The rotational power of the main shaft 72 transmitted to the low driven gear 85 drives the counter shaft 73. In this way, a first speed is established in the multistage transmission 71.

When the third shifter 96, that is, the fifth speed driven gear 88, in the neutral state moves from the axial reference position to the fifth operating position on the counter shaft 73, the drive projecting part 99a of the third shifter 96 meshes with the driven projecting part 99b of the second speed driven gear 89 in the fifth fitting mechanism 99. The second speed driven gear 89 is joined to the counter shaft 73. The rotational power of the main shaft 72 transmitted to the second speed driven gear 89 drives the counter shaft 73. In this way a second speed is established in the multistage transmission 71.

When the second shifter 95, that is, the fourth speed driven gear 86, in the neutral state moves from the axial reference position to the fourth operating position on the counter shaft 73, the drive projecting part 98a of the second shifter 95 meshes with the driven projecting part 98b of the third speed driven gear 87 in the fourth fitting mechanism 98. The third speed driven gear 87 is joined to the counter shaft 73. The rotational power of the main shaft 72 transmitted to the third speed driven gear 87 drives the counter shaft 73. In this way a third speed is established in the multistage transmission 71.

When the first shifter 92, that is, the third speed drive gear 82, in the neutral state moves from the axial reference position to the first operating position on the main shaft 72, the drive projecting part 93a of the first shifter 92 meshes with the driven projecting part 93b of the fourth speed drive gear 81 in the first fitting mechanism 93. The fourth speed drive gear 81 is joined to the main shaft 72. The rotational power of the main shaft 72 is transmitted to the fourth speed drive gear 81. Since the fourth speed drive gear 81 of the main shaft 72 meshes with the fourth speed driven gear 86 of the counter shaft 73, the rotational power of the main shaft 72 drives the counter shaft 73. In this way a fourth speed is established in the multistage transmission 71.

When the first shifter 92, that is, the third speed drive gear 82, in the neutral state moves from the axial reference position to the second operating position on the main shaft 72, the drive projecting part 94a of the first shifter 92 meshes with the driven projecting part 94b of the fifth speed drive gear 83 in the second fitting mechanism 94. The fifth speed drive gear 83 is joined to the main shaft 72. The rotational power of the main shaft 72 is transmitted to the fifth speed drive gear 83. Since the fifth speed drive gear 83 of the main shaft 72 meshes with the fifth speed driven gear 88 of the counter shaft 73, the rotational power of the main shaft 72 drives the counter shaft 73. In this way a fifth speed is established in the multistage transmission 71.

Figure 9:
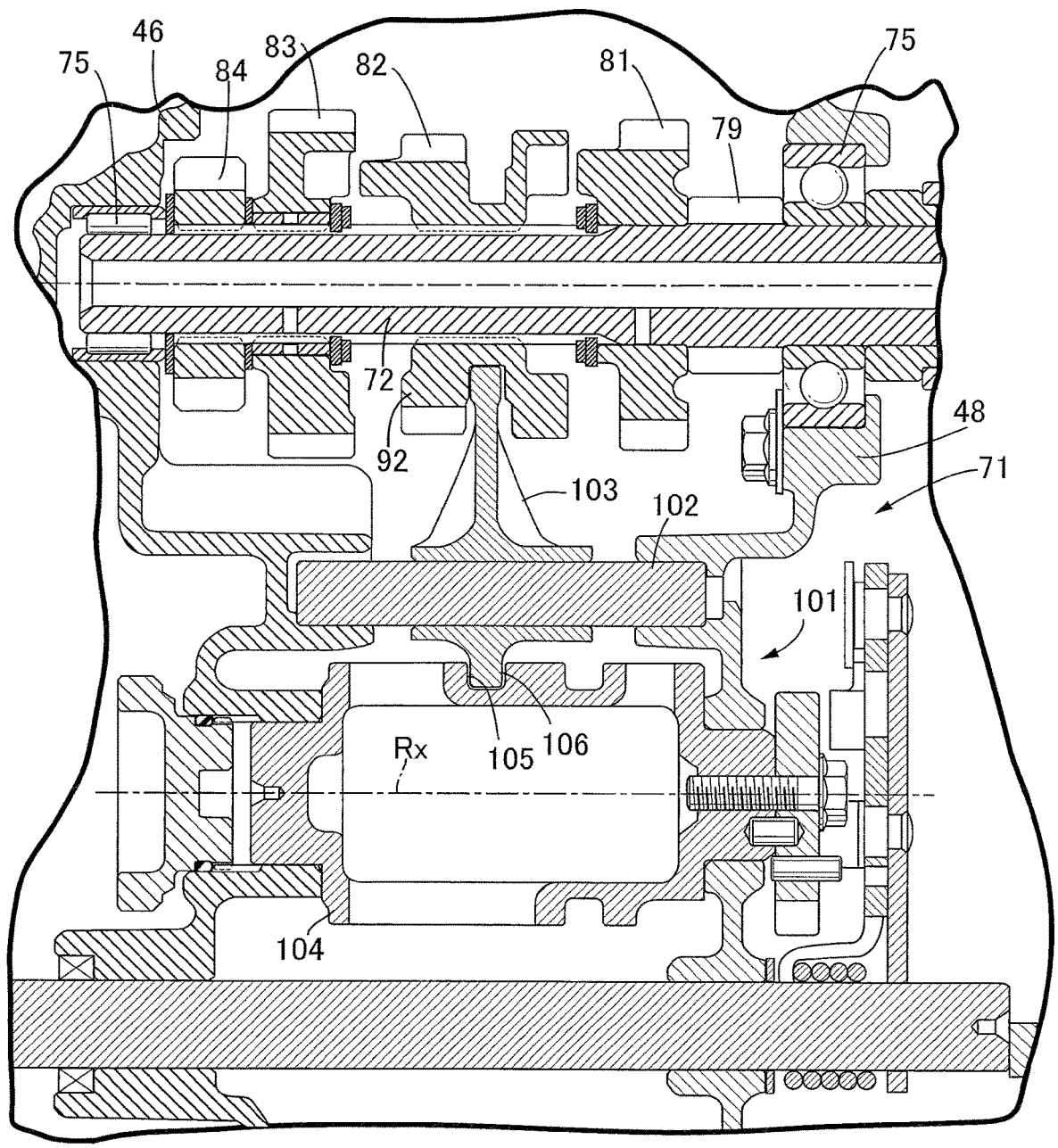
FIG. 9 is an enlarged partial sectional view schematically showing the arrangement of a shift mechanism.

As shown in FIG. 9, a shift mechanism 101 is incorporated into the multistage transmission 71. The shift mechanism 101 includes a guide shaft 102 extending in parallel with the axis of the main shaft 72. A shift fork 103 is axially displaceably supported on the guide shaft 102. The shift fork 103 extends in a direction orthogonal to the axis of the guide shaft 102 and is linked to the first shifter 92 on the main shaft 72.

The shift mechanism 101 includes a shift drum 104. The shift drum 104 is supported so that it can rotate around a rotational axis Rx extending in parallel with the axis of the guide shaft 102. A cam groove 105 is cut in an outer peripheral face of the shift drum 104. The cam groove 105 changes its position in the axial direction of the shift drum 104 according to the rotational angle. A pin 106 is inserted into the cam groove 105, the pin 106 projecting from the shift fork 103 in a direction orthogonal to the axis of the guide shaft 102. In this way, the shift fork 103 moves along the guide shaft 102 in response to rotation of the shift drum 104. Movement of the shift fork 103 triggers movement of the first shifter 92 on the main shaft 72.

Figure 10:
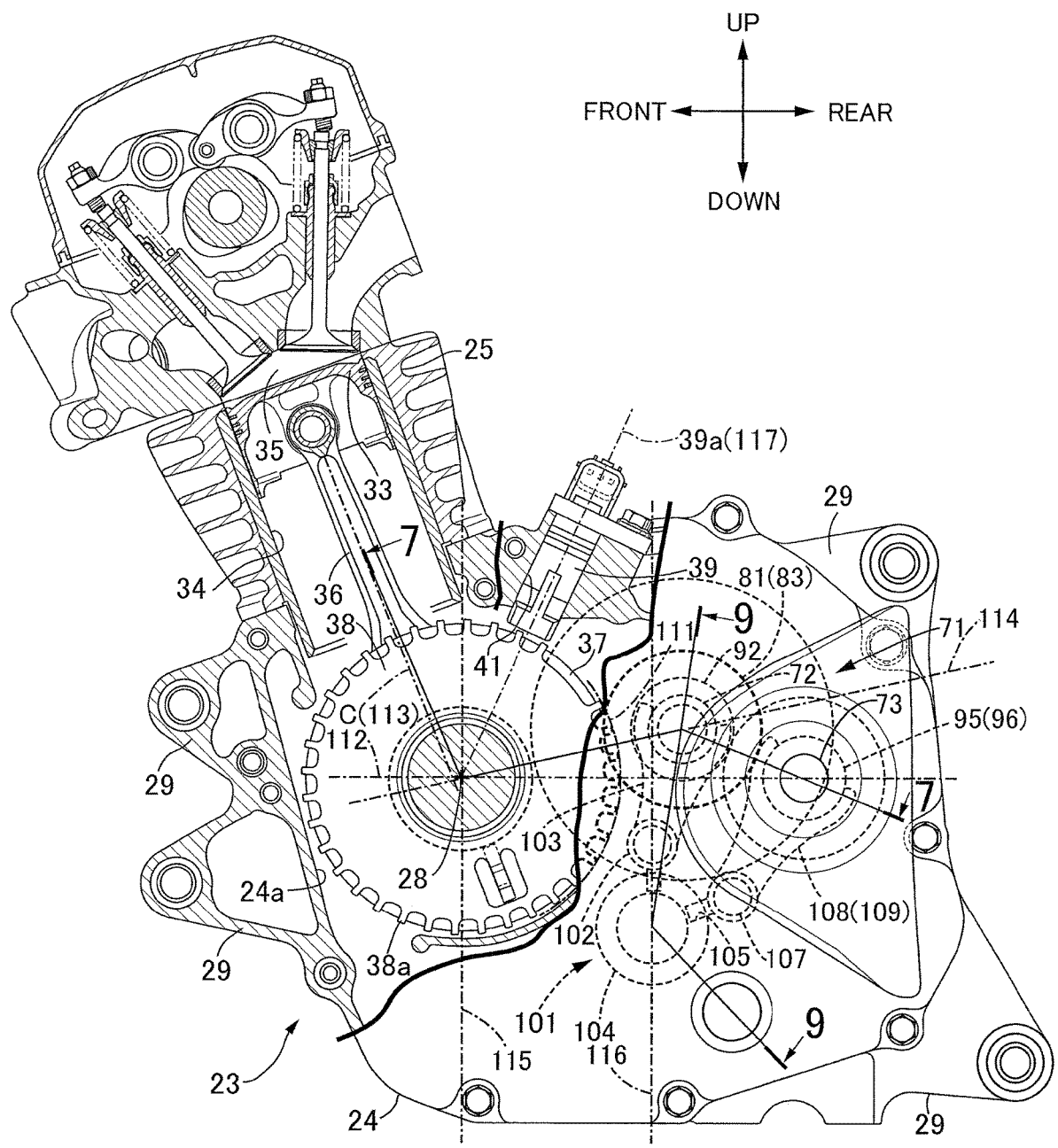
FIG. 10 is an enlarged partial sectional view, corresponding to FIG. 2, of the two-wheeled motor vehicle schematically showing the positional relationship between the pulser ring and the multistage transmission.

As shown in FIG. 10, the same shift mechanism is also related to the second shifter 95 and the third shifter 96 on the counter shaft 73. The shift mechanism 101 includes a guide shaft 107 extending in parallel with the axis of the counter shaft 73, and two shift forks 108 and 109 axially displaceably supported on the guide shaft 107 and individually linked to the second shifter 95 and the third shifter 96 on the counter shaft 73. The two shift forks 108 and 109 each have a pin inserted into the cam groove 105 of the shift drum 104 and move along the guide shaft 107 in response to rotation of the shift drum 104.

In the present embodiment, the pulser ring 38 interferes with the fourth speed drive gear 81 and the fifth speed drive gear 83 on the main shaft 72 of the multistage transmission 71 when viewed from the side at a position an infinite distance along the rotational axis 28 of the crankshaft 37. In other words, the fifth speed drive gear 83 and the fourth speed drive gear 81 enter inside an imaginary cylindrical plane 111 having a central axis on the rotational axis 28 of the crankshaft 37 and partitioning the outermost edge of the pulser ring 38. Moreover, the pulser sensor 39 and an area in which the pulser ring 38 and the drive gears 81 and 83 interfere are disposed within a space, to the rear of the cylinder block 25, partitioned by a virtual plane 112 including the rotational axis 28 of the crankshaft 37 and the rotational axis of the counter shaft 73 and a virtual plane 113 in parallel with the rotational axis 28 of the crankshaft 37 and including a cylinder axis C. Therefore, in a transparent view from the side, the pulser sensor 39 and the area in which the pulser ring 38 and the drive gears 81 and 83 interfere are positioned in a region, to the rear of the cylinder block 25, partitioned by the cylinder axis C and a straight line including the center of the crankshaft 37 and the center of the counter shaft 73.

The area in which the pulser ring 38 and the drive gears 81 and 83 interfere is disposed in one of spaces partitioned by the virtual plane 112 including the rotational axis 28 of the crankshaft 37 and the axis of the counter shaft 73, and the shift drum 104 of the multistage transmission 71 is disposed in the other space partitioned by the virtual plane 112. In other words, in a transparent view from the side, the area in which the pulser ring 38 and the drive gears 81 and 83 interfere is positioned on the upper side of the straight line joining the center of the crankshaft 37 and the center of the counter shaft 73, and the shift drum 104 is positioned on the lower side of the straight line joining the center of the crankshaft 37 and the center of the counter shaft 73. The pulser sensor 39 is disposed in one of spaces partitioned by a virtual plane 114 including the rotational axis 28 of the crankshaft 37 and the axis of the main shaft 72, and the shift drum 104 of the multistage transmission 71 is disposed in the other space partitioned by the virtual plane. In other words, in a transparent view from the side, the pulser sensor 39 is positioned on the upper side of a straight line joining the center of the crankshaft 37 and the center of the main shaft 72, and the shift drum 104 is positioned on the lower side of the straight line joining the center of the crankshaft 37 and the center of the main shaft 72. Furthermore, the pulser sensor 39 and the area in which the pulser ring 38 and the drive gears 81 and 83 interfere are disposed to the rear of a virtual vertical plane 115 parallel to the direction of gravity and including the rotational axis 28 of the crankshaft 37 and in front of a virtual vertical plane 116 parallel to the direction of gravity and including the axis of the shift drum 104. In other words, in a transparent view from the side, the pulser sensor 39 and the area in which the pulser ring 38 and the drive gears 81 and 83 interfere are positioned to the rear of a straight line extending through the rotational axis 28 of the crankshaft 37 in the direction of gravity and in front of a straight line extending through the axis of the shift drum 104 in the direction of gravity.

The main shaft 72 of the transmission 71 is disposed within a space sandwiched by the virtual plane 112 including the rotational axis 28 of the crankshaft 37 and the axis of the counter shaft 73 and a virtual plane 117 including the rotational axis 28 of the crankshaft 37 and the detection axis 39a of the pulser sensor 39. That is, in a transparent view from the side, the main shaft 72 is positioned in a region sandwiched between the straight line joining the center of the crankshaft 37 and the center of the counter shaft 73 and the detection axis 39a of the pulser sensor 39. The area in which the pulser ring 38 and the drive gears 81 and 83 interfere is similarly positioned in a region sandwiched between the straight line joining the center of the crankshaft 37 and the center of the counter shaft 73 and the axis of the pulser sensor 39.

When assembling the internal combustion engine 23, the crankshaft 37, and the main shaft 72 and counter shaft 73 of the transmission 71 are attached to the second half body 48 of the crankcase 24. In this process, in a case where the crankshaft 37 is press fitted into the second bearing 47 prior to the main shaft 72, the pulser ring 38 is not mounted on the crankshaft 37. Whereas the fourth drive gear 81 and the third drive gear (first shifter 92) are fitted onto the main shaft 72, the fifth drive gear 83 and the second drive gear 84 are not mounted. All of the driven gears 85 to 89 are fitted onto the counter shaft 73. Subsequently, the pulser ring 38 is fixed to the crankshaft 37. Following this, the fifth speed drive gear 83 and the second speed drive gear 84 are fitted onto the main shaft 72.

In a case where the main shaft 72 is fitted into the bearing 75 prior to the crankshaft 37, the fourth drive gear 81 and the third drive gear (first shifter 92) are fitted onto the main shaft 72, whereas the fifth drive gear 83 and the second drive gear 84 are not mounted. When subsequently assembling the crankshaft 37 the pulser ring 38 may be fixed to the crankshaft 37 in advance. After attaching the crankshaft 37, the fifth speed drive gear 83 and the second speed drive gear 84 are fitted onto the main shaft 72.

Figure 11:
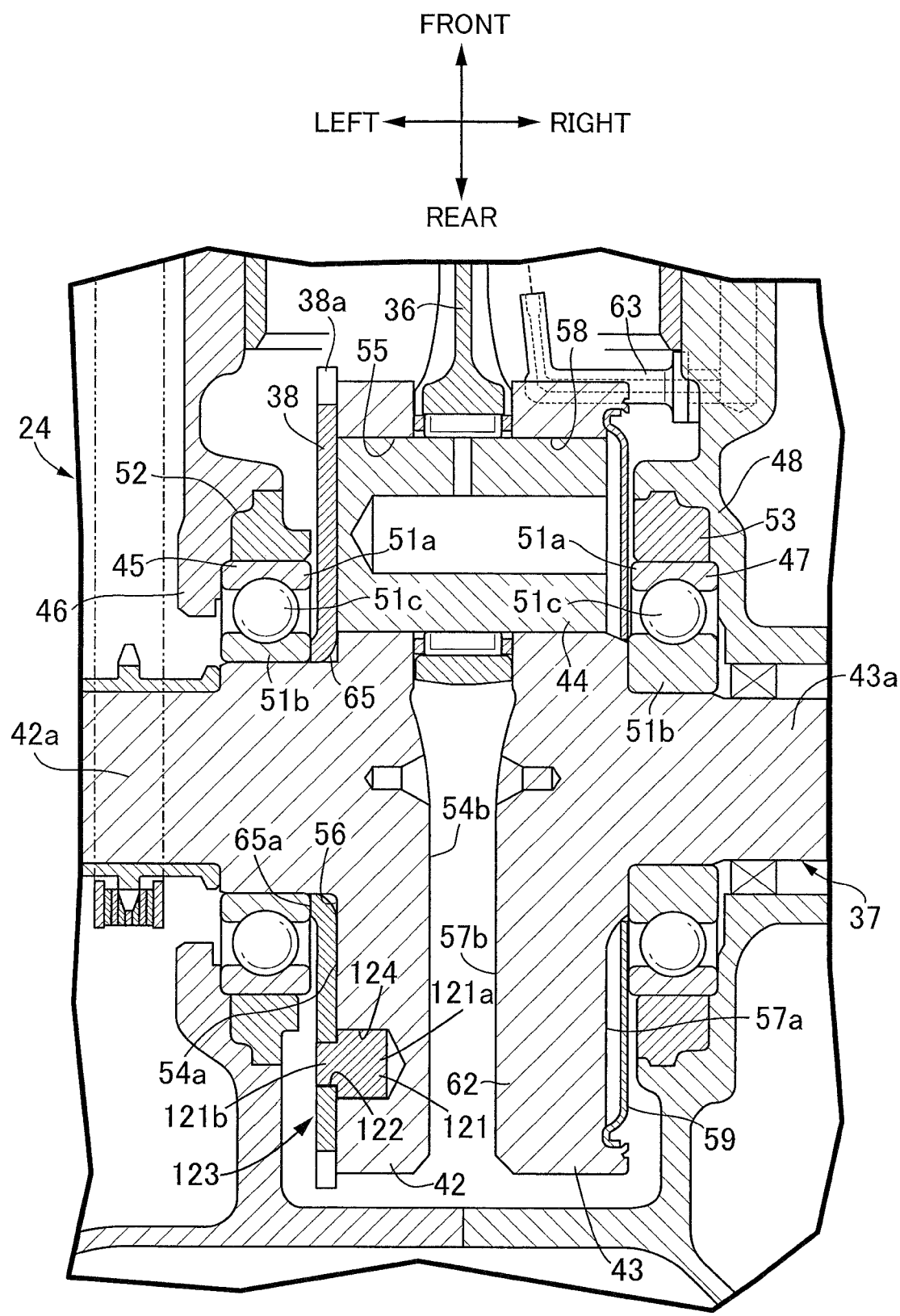
FIG. 11 is an enlarged partial sectional view, corresponding to FIG. 3, of the internal combustion engine schematically showing a locking mechanism related to another specific example.
Figure 12:
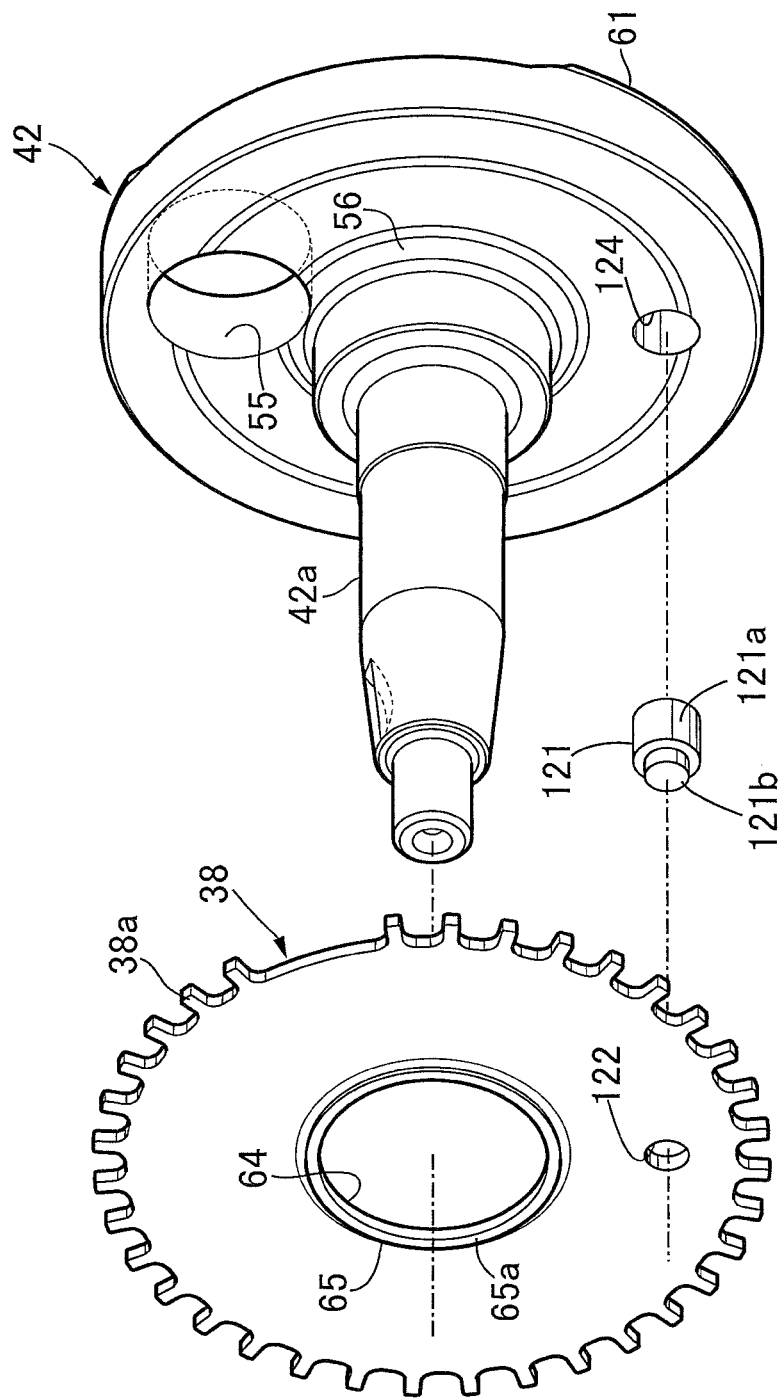
FIG. 12 is an enlarged perspective view, corresponding to FIG. 4, of the pulser ring and the first crank web schematically showing a locking mechanism related to another specific example.

In the internal combustion engine 23, instead of the locking mechanism 67 formed from the projecting piece 68 and the depression 69 as described above, as shown in FIG. 11 and FIG. 12 a locking mechanism 123 having a knock pin 121 projecting from the first crank web 42 and a through hole 122 formed in the pulser ring 38 and receiving the knock pin 121 when the pulser ring 38 is superimposed on the first crank web 42 may be used. The knock pin 121 may have a large diameter portion 121*a* press fitted into a fitting hole 124 as a cylindrical space formed in the first crank web 42 and having the central axis parallel to the rotational axis 28 of the crankshaft 37, and a small diameter portion 124*b* projecting from the surface of the first crank web 42 and press fitted into the through hole 122 of the pulser ring 38. The knock pin 121 prevents relative rotation between the pulser ring 38 and the first crank web 42 around the rotational axis 28 of the crankshaft 37.

The invention claimed is:

1. An internal combustion engine comprising:
   a crankcase that defines a crank chamber;
   a crankshaft that is rotatably supported on the crankcase via a pair of bearings and has a crank housed in the crank chamber;
   a to-be-detected body that is housed in the crank chamber and is supported on the crankshaft; and
   a detection sensor that is made to face a trajectory of the to-be-detected body and detects movement of the to-be-detected body to generate a pulse signal,
   wherein the to-be-detected body is disposed on an inner side of the bearing,
   wherein the bearing has an outer race member that is fixed to the crankcase, and an inner race member that is joined to the crankshaft and rotates relative to the outer race member, and
   wherein the to-be-detected body is disposed between the inner race member and the crank,
   wherein a locking mechanism is formed between the to-be-detected body and the crank, the locking mechanism preventing relative rotation between the to-be-detected body and the crankshaft around a rotational axis of the crankshaft.

2. The internal combustion engine according to claim 1, further comprising:
   a cylinder block that extends upward from the crankcase; and
   the detection sensor is mounted on an upper side of the crankcase at the rear of the cylinder block.

3. The internal combustion engine according to claim 1, wherein the detection sensor is mounted on a front wall of the crankcase.

4. The internal combustion engine according to claim 3, wherein the detection sensor is disposed between engine hangers formed on the crankcase.

5. The internal combustion engine according to claim 1, wherein the to-be-detected body interferes with a drive gear on a main shaft of a transmission when viewed in an axial direction of the crankshaft.

6. An internal combustion engine comprising:
   a crankcase that defines a crank chamber;
   a crankshaft that is rotatably supported on the crankcase via a pair of bearings and has a crank housed in the crank chamber;
   a to-be-detected body that is housed in the crank chamber and is supported on the crankshaft; and
   a detection sensor that is made to face a trajectory of the to-be-detected body and detects movement of the to-be-detected body to generate a pulse signal,
   wherein the to-be-detected body is disposed on an inner side of the bearing, and
   wherein the crank comprises:
      a first crank web that has a crank weight and a first shaft supported on one of the bearings so that they can rotate around the rotational axis and that supports the to-be-detected body;
      a second crank web that has a crank weight and a second shaft supported on the other of the bearings so that they can rotate around the rotational axis and that supports a centrifugal oil filter; and
      a crank pin that is disposed at a position displaced from the rotational axis of the crankshaft, links the first crank web and the second crank web to each other, and is linked to a connecting rod.

7. The internal combustion engine according to claim 6, further comprising:
   a cylinder block that extends upward from the crankcase; and
   the detection sensor is mounted on an upper side of the crankcase at the rear of the cylinder block.

8. The internal combustion engine according to claim 6, wherein the detection sensor is mounted on a front wall of the crankcase.

9. The internal combustion engine according to claim 8, wherein the detection sensor is disposed between engine hangers formed on the crankcase.

10. The internal combustion engine according to claim 6, wherein the to-be-detected body interferes with a drive gear on a main shaft of a transmission when viewed in an axial direction of the crankshaft.

* * * * *